United States Patent
Lewkow et al.

(10) Patent No.: US 9,746,896 B1
(45) Date of Patent: Aug. 29, 2017

(54) POWER CONSERVATION IN ALWAYS-ON DISPLAYS

(71) Applicant: Google Inc., Mountain View, CA (US)

(72) Inventors: Roman Lewkow, San Jose, CA (US); Philipp Schmaelzle, Los Altos, CA (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 14/851,344

(22) Filed: Sep. 11, 2015

Related U.S. Application Data

(60) Provisional application No. 62/204,805, filed on Aug. 13, 2015.

(51) Int. Cl.
| | | |
|---|---|---|
| *G06F 1/32* | (2006.01) | |
| *G09G 5/18* | (2006.01) | |
| *G09G 3/32* | (2016.01) | |
| *G06F 3/041* | (2006.01) | |
| *G09G 3/3233* | (2016.01) | |
| *G09G 3/3291* | (2016.01) | |

(52) U.S. Cl.
CPC ............ *G06F 1/3203* (2013.01); *G06F 3/041* (2013.01); *G09G 3/3233* (2013.01); *G09G 3/3291* (2013.01); *G09G 5/18* (2013.01); *G09G 2330/021* (2013.01)

(58) Field of Classification Search
CPC .......................... G06F 1/3203; G09G 2330/021
See application file for complete search history.

(56) References Cited

U.S. PATENT DOCUMENTS

| | | | |
|---|---|---|---|
| 7,145,558 B2 | 12/2006 | Ong | |
| 7,609,049 B1* | 10/2009 | Tian .................. | G01R 19/16542 324/522 |
| 7,995,050 B2* | 8/2011 | Wong ...................... | G09G 3/20 345/204 |
| 8,339,429 B2 | 12/2012 | Canu et al. | |
| 8,816,968 B2 | 8/2014 | Mishra et al. | |
| 2002/0063671 A1 | 5/2002 | Knapp | |
| 2006/0087502 A1 | 4/2006 | Karidis et al. | |
| 2010/0026724 A1 | 2/2010 | Goto | |
| 2010/0110061 A1* | 5/2010 | Chen .................... | G09G 3/3648 345/213 |
| 2010/0180228 A1 | 7/2010 | Ben-Harrush et al. | |
| 2011/0285615 A1 | 11/2011 | Rayadurga | |
| 2014/0344608 A1 | 11/2014 | Wang | |
| 2015/0022515 A1* | 1/2015 | Ikeda ................... | G09G 3/3275 345/212 |

* cited by examiner

*Primary Examiner* — Larry Sternbane
(74) *Attorney, Agent, or Firm* — Shumaker & Sieffert, P.A.

(57) ABSTRACT

A computing device is described that includes a display unit. The display unit includes an array of pixels defined by N rows and M columns and at least one row select unit configured to select one or more of the N rows. The display unit further includes a first column control unit configured to drive a first contiguous group of pixels from the array of pixels, and a second column control unit configured to drive a second contiguous group of pixels from the array of pixels.

20 Claims, 6 Drawing Sheets

POWER CONSERVATION IN ALWAYS-ON DISPLAYS

This application claims the benefit of U.S. Provisional Application No. 62/204,805, filed Aug. 13, 2015, the entire content of which is hereby incorporated by reference.

BACKGROUND

Many computing devices control displays for outputting information to users. While some computing devices switch-off displays during periods of non-use, other computing devices may display information, or at least maintain a display in an actively ready-state for presenting information, even when the computing device is not being used. For example, a battery-powered device (e.g., a wearable device, mobile device or stationary device) may always display a clock or one or more other graphical indicators at a small portion of a display even after prolonged periods of user-inactivity.

These so-called "always-on" devices may waste power keeping an entire display area activated just for presenting information at only a small portion of a display screen. For example, an always-on type computing device may toggle and drive each of the horizontal and vertical control wires of a pixel-array even though only a small corner or edge of a display screen is being used to present information. This may cause continuous recharging of row select and control wires (including transistor loads connected to them in pixel cells) causing undesirable power consumption. In addition, the always activated row and column wire drivers may cause further undesirable power consumption.

DETAILED DESCRIPTION

Figure 1:
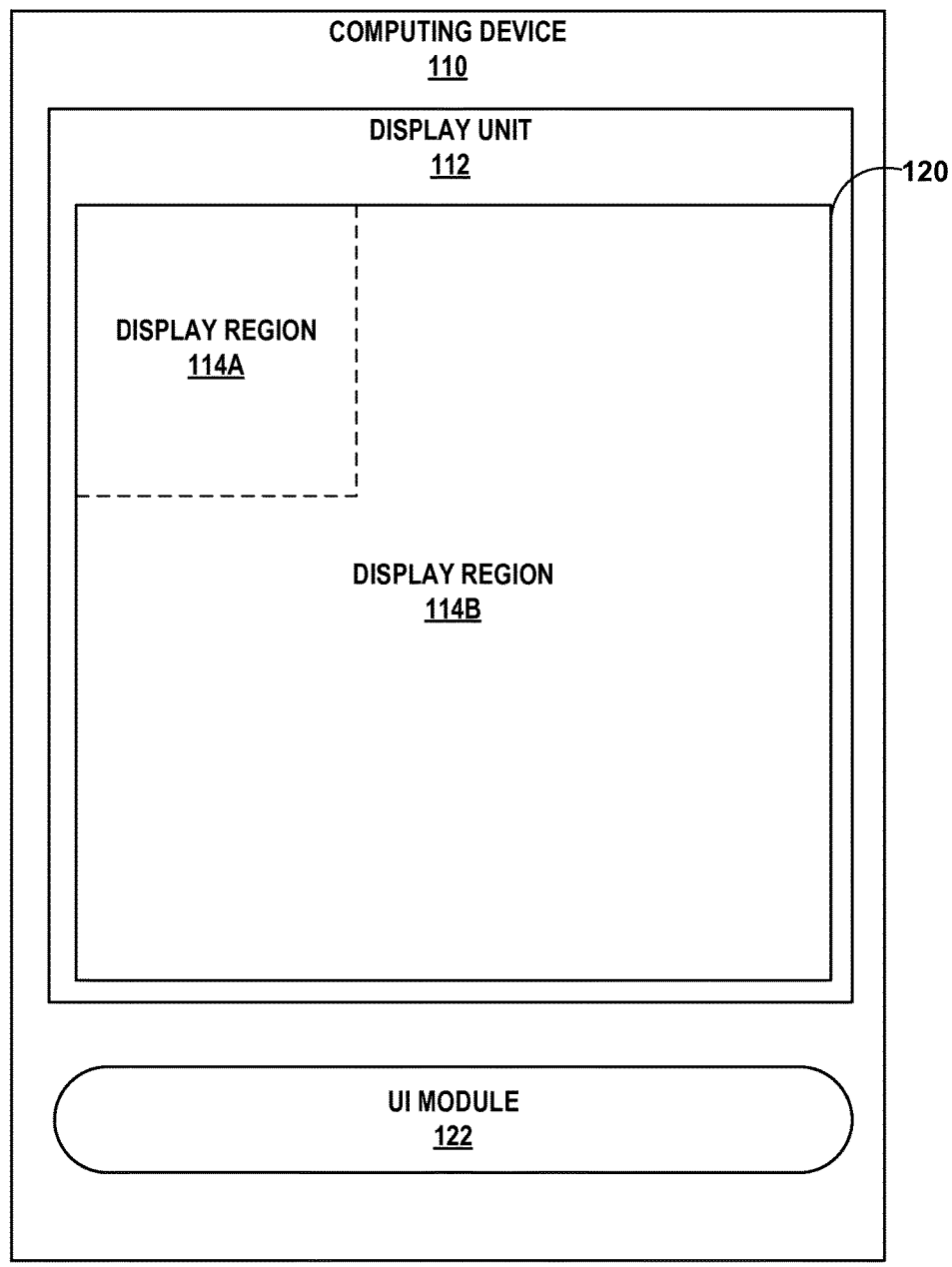
FIG. 1 is a conceptual diagram illustrating an example computing device configured to selectively drive contiguous portions of a pixel-array of an example display unit, in accordance with one or more aspects of the present disclosure.

In general, techniques of this disclosure may enable a computing device to drive pixels of an active region of a display unit while maintaining remaining pixels of the display unit that are located outside the active region, in an in-active state. The display unit may segment some of the column control wires, and optionally, some of the row select wires, in such a way that only those pixels located in a smaller designated active area of the pixel area can be driven dynamically with image information when the computing device operates in a low power mode while the rest of the pixel array can be held in a steady state (e.g., without constant switching) or in some examples, even powered-off and not be driven with image information.

For example, the computing device may have a display unit that includes an array of pixels or so-called "pixel-array" that is defined by N rows and M columns. The display unit may have one or more row select units that are configured to individually select each of the N rows. The display unit may further include a first column control unit that is configured to drive a first contiguous group of pixels from the array of pixels, and a second column control unit that is configured to drive a second contiguous group of pixels from the array of pixels. Together, the first and second contiguous groups of pixels may make up the entire pixel array.

In any case, while the computing device is operating in a low-power operating state and not a high-power operating state, the computing device may configure the first column control unit to drive the first contiguous group of pixels with graphical information and configure the second column control unit to refrain from driving the second contiguous group of pixels with the graphical information. By configuring the second column control unit to refrain from driving pixels with the graphical information, the computing device may completely disable the second column control unit (e.g., by switching off to cause loss of function), and in other examples, the computing device may not completely disable the second column control unit but instead may configure the second column control unit to operate in an alternate mode where the second column control unit drives the associated columns with a steady signal using very little power but does not drive the associated columns with the graphical information that is being output for display.

The first column control unit may refresh the pixels of the first contiguous region with graphical information without having to waste power driving the remaining pixels of the second contiguous region with the graphical information. Alternatively, while the computing device is operating in the high-power operating state, the computing device may enable the full-drive functionality of both the first column control unit and the second column control unit so that the first column control unit and the second column control unit may together, refresh and drive the entire pixel array (e.g., the pixels of the first contiguous region and the pixels of the second contiguous region) with the graphical information.

In this way, when the computing device is operating in an "always-on" or low-power mode, the example computing device may save power by only configuring the first column control unit to drive pixels with graphical information and configuring the second column control unit to refrain from driving pixels with graphical information, so that graphical information is only presented in the first contiguous region of the pixel-array but not in the second contiguous region of the pixel-array. Conversely, when operating in a high-power mode where minimizing power consumption is a lesser requirement, the computing device may configure both the first and second column control units so that the graphical information can be presented in a way that utilizes the entire pixel array.

FIG. 1 is a conceptual diagram illustrating an example computing device configured to selectively drive contiguous portions of a pixel-array of an example display unit, in accordance with one or more aspects of the present disclosure. In the example of FIG. 1, computing device 110 includes display unit 112 and user interface ("UI") module 122.

In the example of FIG. 1, computing device 110 may be an always-on device that is configured to display information using display unit 112, even when computing device 110 is not likely being used. Computing device 110 may be a mobile computing device, such as a mobile telephone, a tablet computer, a personal digital assistant (PDA), a laptop computer, a portable gaming device, a portable media player, an e-book reader, a watch, a television platform, an automobile computing system, a memory stick based media computing device, an appliance based computing system, a wearable computing device (e.g., a headset device, watch device, eyewear device, a glove device), or other type of mobile, always-on computing device employing a display. In some examples, computing device 110 may be a non-mobile computing device, such as a desktop computing device, a server computing device, a set-top computing device, or other type of non-mobile, always-on computing device employing a display. In some examples, computing device 110 may be a display device that is configured to be operatively coupled to a mobile phone, a tablet computer, a desktop computer, a laptop computer, or other computing device employing a display. In other words, computing device 110, may be a display device that is an internal or external component of a different computing device employing a display.

UI module 122 of computing device 110 may control display unit 112. UI module 112 may be operable (e.g., by one or more processors of computing device 110) to process input received from a user (e.g., through a touch interface attached to display unit 112) and provide output for display at display unit 112. As is described in further detail below, UI module 122 may also configure display unit 112 to operate in a certain way (e.g., depending on a power mode of computing device 110) so as to conserve energy while presenting information to a user. UI module 122 may be implemented in hardware, software, firmware, or some combination thereof, residing in and/or executing at computing device 110. One or more processors of computing device 110 may implement functionality and/or execute instructions stored within computing device 110 for performing operations associated with UI module 122. Computing device 110 may execute UI module 122 with one processor or with multiple processors. In some examples, computing device 110 may execute UI module 122 as a virtual machine executing on underlying hardware. UI module 122 may execute as a service of an operating system or computing platform or may execute cloud based service accessible by computing device 110.

UI module 122 may act as an intermediary between various components of computing device 110 to make determinations based on input detected by a touch interface attached to display unit 112 and/or generate output presented by display unit 112. For instance, UI module 122 may receive, as an input from an application executing at computing device 110, a representation of elements of a graphical user interface. UI module 122 may also receive, as an input from the application, a sequence of touch events generated from information about user input detected by a touch interface attached to display unit 112 as the user interacts with the graphical user interface. UI module 122 may determine, based on the location components in the sequence touch events that one or more location components approximate a selection of one or more locations of the elements of the graphical user interface. UI module 122 may transmit, as output to the application, the sequence of touch events. UI module 122 may receive information from the application to update the graphical user interface presented by display unit 112, for example, to include text or other information based on the user interaction associated with the graphical user interface.

Display unit 112 is configured to output graphical information for display. Display unit 112 includes pixel-array 120 (also referred to herein as "display screen 120" for displaying information to a user. FIG. 1 shows pixel-array 120 being bifurcated into display region 114A and display region 114B. Although shown in the example of FIG. 1 as having two contiguous regions 114A and 114B, in some examples, pixel-array 120 may be divided into more than two contiguous regions.

Display unit 112 of computing device 110 may in some examples be a presence-sensitive display. For example, display unit 112 may function as an input device for computing device 110 and as an output device for computing device 110. Display unit 112 may be implemented using various technologies. For instance, display unit 112 may function as an input device using a presence-sensitive input component, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Display unit 112 may function as an output (e.g., display) device using any one or more display components, such as a liquid crystal display (LCD), dot matrix display, light emitting diode (LED) display, inorganic light-emitting diode (ILED), organic light-emitting diode (OLED) display, e-ink display, monochrome or color display, or any other type of emissive or transmissive display technology that is capable of outputting visible information to a user of computing device 110.

While some computing devices tend to switch-off displays during periods of non-use, other computing devices may display information, or at least maintain a display, or a portion thereof, in an actively ready-state for presenting information, even when the computing device is not being used. For example, a device may always display a clock or one or more other graphical indicators at a small portion of a display even after prolonged periods of user-inactivity. Some of these so-called "always-on" devices may be less efficient and may waste power keeping an entire display area activated only to present information at a small portion of a display screen.

A typical pixel array or display screen of a display may be defined by one or more rows and columns of pixels. A display controller may include a row select unit that continuously selects each row of pixels for refresh and a column control unit that drives each pixel in each selected row with display data. In other words, a display may include a single row select unit to sequentially select each individual row and a single column control unit to drive each pixel in the selected row with display data.

Even though only a small corner or edge of a display screen may be used to present information during periods of inactivity, the row select unit and column control unit may together, toggle and drive all of the pixels in a pixel-array, including the pixels that are not being used to present information.

Unlike other always-on computing devices that may continuously toggle and drive all of the pixels in a pixel-array or otherwise keep an entire pixel-array in an always-active or always-ready state, even when the computing device is not being used, computing device 110 may configure display unit 112 to drive either one or both of display regions 114A and 114B with graphical information, depending on whether device 110 is likely being used or not. For example, as is described in detail below, display unit 112 may include multiple column control units, with each of the multiple column control units being assigned to a different display region 114A or 114B of display screen 120.

Display unit 112 may have a first column control unit associated with display region 114A and a second column control unit associated with display region 114B. When computing device 110 is operating in a low-power mode and the majority of the display area is likely not being used, UI module 122 of computing device 110 may cause display unit 112 to present graphical information only at display region 114A by configuring the first column control unit (e.g., the column control unit associated with display region 114A) to output graphical information for display and configuring the second column control unit (e.g., the column control unit associated with display region 114B) to refrain from outputting graphical information for display. UI module 122 may use the single driver control unit that is configured to drive display data into the pixels associated with display region 114A. Conversely, when computing device 110 is operating in a high-power mode and the entire display area is being used, UI module 122 or computing device 110 may configure display unit 112 to present graphical information at both display regions 114A and 114B by configuring both the first and second column control units associated with both display regions 114A and 114B to drive display data into all the pixels associated with pixel array 120.

In other words, display unit 112 may be designed in such a way that only the pixels located in the active region 114A or 114B of display screen 120 are refreshed and driven with display data while the control wires serving other pixels of display screen 120 (e.g., those not being used to display information to the user) are held in a static off-state (e.g., display unit 112 may configure a column control unit that is configured to refrain from outputting graphical information to activate a simple switch, instead of a full analog level driver, or use a multiplexer ("MUX") to connect the respective column wire to a static drive source). This way, when only a portion of display screen 120 is presenting information to the user, display unit 112 may consume less power by only having to drive some of the pixels of pixel array 120, using only some of the row and column drivers.

For example, the control wires and drivers that display unit 112 uses to drive the pixels of display region 114A may be disconnected and isolated from the drivers and control wires that display unit 112 uses to drive the pixels of display region 114B. In some examples, the select wires and drivers that display unit 112 uses to select the pixels of display region 114A may be disconnected and isolated from the drivers and select wires that display unit 112 uses to select the pixels of display region 114B. In other examples, the select wires and drivers that display unit 112 uses to select the pixels of display region 114A may be the same drivers and select wires that display unit 112 uses to select the pixels of display region 114B.

In this way, rather than have to constantly drive all the pixels of pixel-array 120 with display data, even when computing device 110 is not being used or is only presenting information at one particular display region 114A or 114B, computing device 110 can reconfigure display unit 112 to drive, based on the power requirements of computing device 110: just the pixels from display region 114A, just the pixels from display region 114B, or if necessary, the pixels from both display region 114A and 114B.

Figure 2:
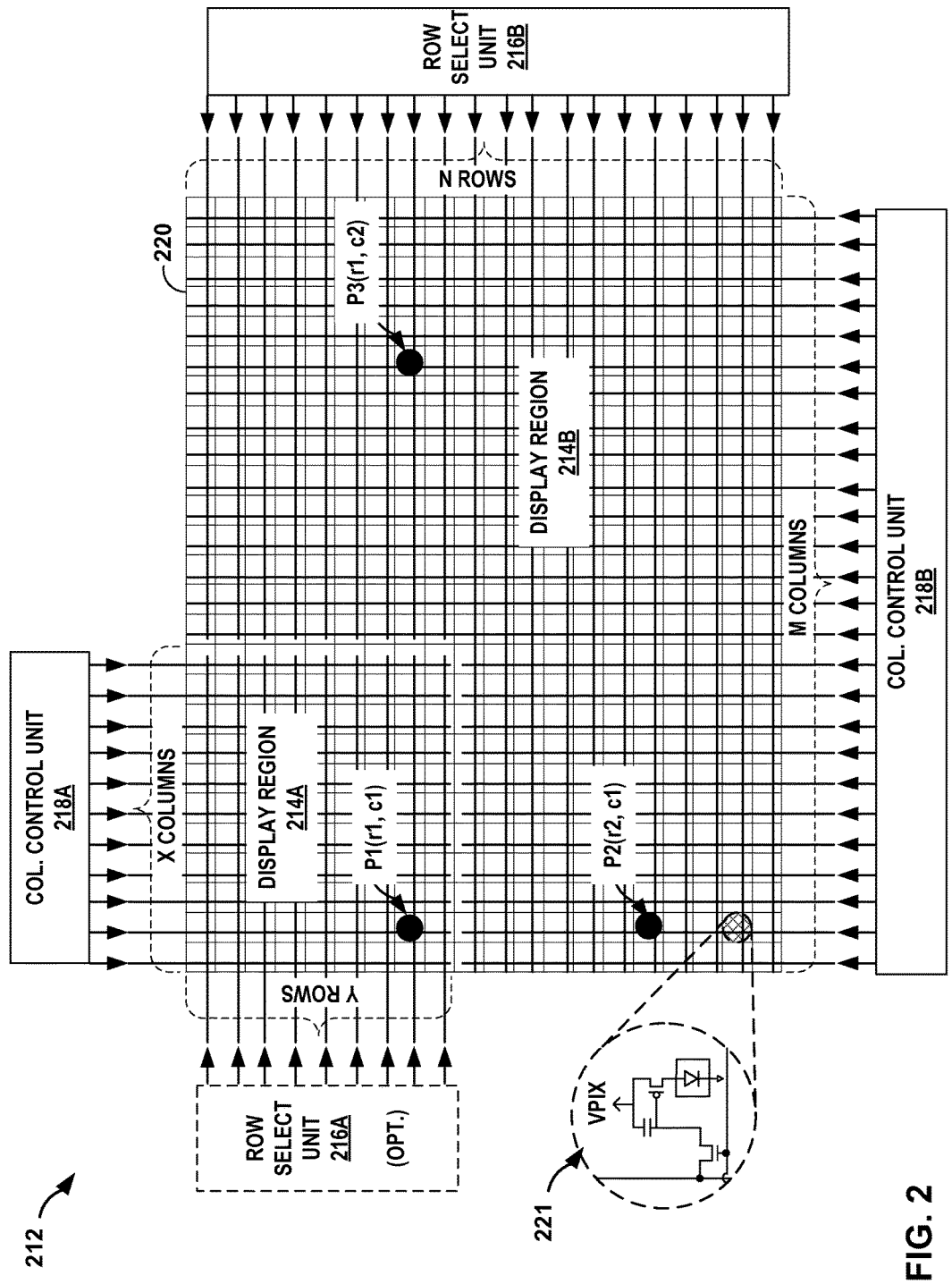
FIG. 2 a conceptual diagram illustrating an example display unit having a plurality of individually selectable, contiguous-display regions of a pixel-array, in accordance with one or more aspects of the present disclosure.

FIG. 2 is a conceptual diagram illustrating display unit 212 as an example display unit having a plurality of individually selectable, contiguous-display regions of a pixel-array, in accordance with one or more aspects of the present disclosure. Display unit 212 represents an example of display unit 112 of FIG. 1 and is described below in the context of computing device 110 of FIG. 1.

Display unit 212 includes pixel array 220 also referred to herein as "display screen 220"). Pixel array 220 may be defined by N rows and M columns of pixels. Pixel array 220 may be an emissive pixel display or a transmissive pixel display. That is to say, each pixel in pixel array 220 may produce and emit light independently from each of the other pixels. For example, each pixel from pixel array 220 may include an organic or inorganic light emitting diode and other circuitry for producing and emitting light when selected and driven with an analog data signal. Or pixel array 220 may rely on a backlight (not shown in FIG. 2) located behind or beneath pixel array 220 that acts as a source of light, modulated by each of the pixel elements. Exploded view 221 shows just one example of a pixel circuit that includes an emissive pixel and associated circuitry that may produce and emit light when selected and driven with graphical information in accordance with techniques of this disclosure. Many other examples of emissive and transmissive pixel circuits exist and can be used in lieu of the pixel circuit shown in exploded view 221.

Exploded view 221 shows that each pixel includes a connection to "VPIX" (e.g., a common power source). In some examples, display unit 212 includes a single VPIX power source for both display regions 214A and 214B. In other examples, display unit 212 includes a respective VPIX power source for each of display regions 214A and 214B such that the pixels of display region 214A may receive VPIX power from VPIX "A" and the pixels of display region 214B may receive power from VPIX "B". In examples where display unit 212 includes two separate VPIX power sources, and as is described below, to configure column control unit 218B to refrain from driving the pixels from display region 214B with graphical information, computing device 100 may simply disconnect display region 214B from VPIX "B". Conversely, to configure column control unit 218B to drive the pixels from display region 214B with graphical information, computing device 100 may simply re-connect display region 214B to VPIX "B". In the example of FIG. 2, pixels P1, P2, and P3 are represented by black dots with parenthetical row and column location identifiers (row, column) shown as (r1, c1), (r2, c1), and (r1, c2), respectively. Pixels P1 and P3 are located in the same row r1 of pixel array 220 and pixels P1 and P2 are located in the same column c1 of pixel array 220.

Pixel array 220 is bifurcated into contiguous display regions 214A and 214B. Pixel P1 is located in display region 214A and pixels P2 and P3 are located in display region 214B. Display region 214A encompasses an area of X columns by Y rows, where Y is an integer less than N and X is an integer less than M. Display region 214B encompasses the remainder of pixel array 220 that excludes display region 214A.

In some examples, display regions 214A and 214B overlap. In some examples, such as the example shown in FIG. 2, display regions 214A and 214B represent two non-overlapping contiguous groups of pixels. In some examples, the contiguous group of pixels represented by display region 214B have a greater quantity of pixels than the contiguous group of pixels represented by display region 214A. And in some examples, the first and second contiguous groups of pixels represented by display regions 214A and 214B have a same quantity of pixels.

Display region 214A may be associated with both a full-power mode and a low-power mode of computing device 110 whereas display region 214B may only be associated with the full-power mode of computing device 110. In other words, computing device 110 may configure display unit 212 to present graphical information at the pixels of display regions 214A and 214B while operating in a full-power mode where conserving power is of a lesser requirement. Conversely, while operating in a low-power mode where conserving power is of a greater importance, computing device 210 may configure display unit 212 to present graphical information at the pixels of display region 214A and may configure display unit 212 to refrain from presenting any graphical information at the pixels of display region 214B.

To enable computing device 110 to select between presenting graphical information at one or both of display regions 214A and 214B, display unit 212 includes optional row select unit 216A, row select unit 216B, column control unit 218A, and column control unit 218B. Although shown as having up to two row select units 216A and 216B and two column control units 218A and 218B, in some examples, display unit 212 may include any quantity of one or more row select units and a respective column control unit for each contiguous display region.

Column control unit 218A is configured to drive display data at each pixel from display region 214A and column control unit 218B is configured to drive display data at each pixel from display region 214B. In other words, display unit 212 includes column control unit 218A which represents a first column control unit configured to drive a first contiguous group of pixels from an array of pixels and column control unit 218B which represents a second column control unit configured to drive a second contiguous group of pixels from the array of pixels. The column control wires or X columns of display region 214A are isolated from column control unit 218B and can only be controlled by column control unit 218A. In other words, the column control wires of display region 214A do not span any part of display region 214B. The column control wires of display region 214A that are used to drive data to the pixels of display region 214A are isolated from column control unit 218B.

Similarly, the column control wires or M columns of display region 214B can only be controlled by column control unit 218B and are isolated from column control unit 218A. In other words, the column control wires of display region 214B do not span any part of display region 214A. The column control wires of display region 214B that are used to drive data to the pixels of display region 214B are isolated from column control unit 218A.

For example, even though pixels P1 and P2 are both located in column c1 of pixel array 220, column control unit 218A is configured to drive pixel P1 with display data and cannot drive pixel P2 with display data, whereas column control unit 218B is configured to drive pixel P2 with display data and cannot drive pixel P1 with display data.

Row select units 216A and 216B are configured to continuously, and sequentially, select individual rows of pixels from pixel array 220 at a particular refresh rate. As any one particular row of pixel array 220 is selected, column control unit 218 and/or 218B drive the pixels in the selected row of pixel array 220 with display data specific to the pixel (or pixels) located at the intersections of the selected row and the driven columns.

In some configurations, row select unit 216B may be configured to select each of the one or more N rows of pixels of pixel array 220 in both display regions 214A and 214B. Row select unit 216A may be configured to only select each of the one or more Y rows of pixels of display region 214A while being isolated from each of the one or more N rows of display region 214B. In other words, row select unit 216B may be configured to select any one of the N rows from pixel array 220 whereas row select unit 216A may be configured to select any one of the Y rows from display region 214A only. For example, computing device 110 may enable row select unit 216B for selecting the pixels of row r1, including pixels P3 and P1, when computing device 110 operates in a full-power mode. Whereas when computing device 110 operates in a low-power mode, computing device 110 may reconfigure row select unit 216B to prevent row select unit 216B from selecting any of the rows of pixels of pixel array 220 and may enable row select unit 216A for selecting the pixels of row r1 that are within display region 214A, including pixel P1. In some examples, by reconfiguring row select unit 216B, computing device 110 may cause row select unit 216B to hold each of the row select wires that span display region 214B in a steady state for not presenting graphical information.

In cases where display unit 212 includes optional row select unit 216A, row select wires in the range of Y rows are isolated (e.g., broken) at the boundary after X columns. Row select unit 216A can only drive Y row select wires as far as the X column boundary, while row select unit 216B can only drive Y row select wires sections from after the X column boundary to the right edge of pixel array 220. In other words, row select unit 216B cannot drive Y row select wires associated with display region 214A.

In other examples, row select unit 216B may be configured to select each of the one or more N rows of pixel array 220 in both display regions 214A and 214B. In other words, row select unit 216B may be configured to simultaneously select each pixel from a single one of N rows that is in display regions 214A and 214B. The row select wires of pixel array 220 may span both display regions 214A and 214B. For example, regardless of the power mode that computing device 110 operates in, row select unit 216B may be able to select row r1, including both pixels P1 and P3, even though only column control unit 218A and not column control unit 218B may be driving the pixels of row r1 with display data.

And in some examples, row select unit 216A may be configured to select each of the one or more Y rows of display region 214A while being isolated from each of the one or more N rows of display region 214B and row select unit 216B may be configured to select each of the one or more N rows of display region 214B while being isolated from each of the one or more Y rows of display region 214A. In other words, the row select wires of pixel array 220 may not span multiple display regions 214A and 214B. The one or more Y rows of display region 214A may be disconnected from each of the one or more N rows of display region 214B. Row select unit 216A may be configured to simultaneously select the pixels from a single one of Y rows that is in display region 214A, and row select unit 216B may be configured to simultaneously select the pixels from a single one of N rows that is in display region 214B. For example, only row select unit 216B may be able to select pixel P3 from row r1 whereas only row select unit 216A may be able to select pixel P1 from row r1.

In operation, UI module 122 may be operable by at least one processor of computing device 110 to responsive to determining that the computing device is operating in a low-power operating state, output, using the first column control unit, for display at the first contiguous group of pixels, first graphical information. Alternatively, and responsive to determining that the computing device is operating in a full-power operating state, output, using the first column control unit and the second column control unit, for display at the first contiguous group of pixels and the second contiguous group of pixels, second graphical information.

In other words, UI module 122 may determine whether computing device 110 is operating in a full-power or low-power mode. UI module 122 may configure display unit 212 to only utilize the pixels of display region 214A when computing device 110 operates in the low-power mode. UI module 122 may configure column control unit 218A to output graphical information for display when computing device 110 operates in the low-power mode to configure column control unit 218A to drive the pixels of display region 214A with data and may configure column control unit 218B to refrain from outputting the graphical information for display when computing device 110 operates in the low-power mode to prevent column control unit 218 from driving the pixels of display region 214B with any data.

Even though column control unit 218B may be configured to refrain from outputting the graphical information for display, control unit 218B may drive each pixel in display region 214B with a steady-state signal (e.g., to ensure display region 214B remains "black") that is unrelated to the graphical information being presented in display region 214B. The steady-state signal may enable column control unit 218B to avoid switching (e.g., recharging) losses due to driving the array wires of display region 214B and their respective loads. In addition, the steady-state signal may enable column control unit 218B to avoid having to operate as linear drivers (e.g., a driver that drives a continuous and varying analog signals onto each column wire), but may enable column control unit 218B to function as a simple switch or multiplexer that connects column wires to a "hold" supply (e.g., constant low voltage power supply) and enables the power-hungry linear driver circuits to be powered down. Of course, in other examples, by configuring column control unit 218B to refrain from outputting the graphical information for display, control unit 218B may power-off each pixel in display region 214B and may not drive any pixel in display region 214B with any kind of steady-state signal.

Conversely, UI module 122 may configure display unit 212 to utilize all the pixels of display regions 214A and 214B when computing device 110 operates in the high-power mode. UI module 122 may configure both column control units 218A and 218B to output graphical information for display when computing device 110 operates in the full-power mode to configure both column control units 218A and 218B to drive the pixels of display regions 214A and 214B with data.

In this way, rather than have to constantly drive all the pixels of pixel-array 220 with display data, when computing device 110 is not being used and is only presenting information at display region 214A, computing device 110 can reconfigure display unit 212 to cause display unit 212 to drive just the pixels from display region 114A by configuring column control unit 218A to output graphical information for display and configuring column control unit 218B to refrain from outputting the graphical information. Conversely, when computing device 110 is operating in a full-power mode and utilizing all the pixels of pixel array 220, computing device 110 can reconfigure display unit 212 to cause display unit 212 to drive the pixels from both display region 114A and 114B by configuring both column control units 218A and 218B to simultaneously output graphical information for display.

Figure 3:
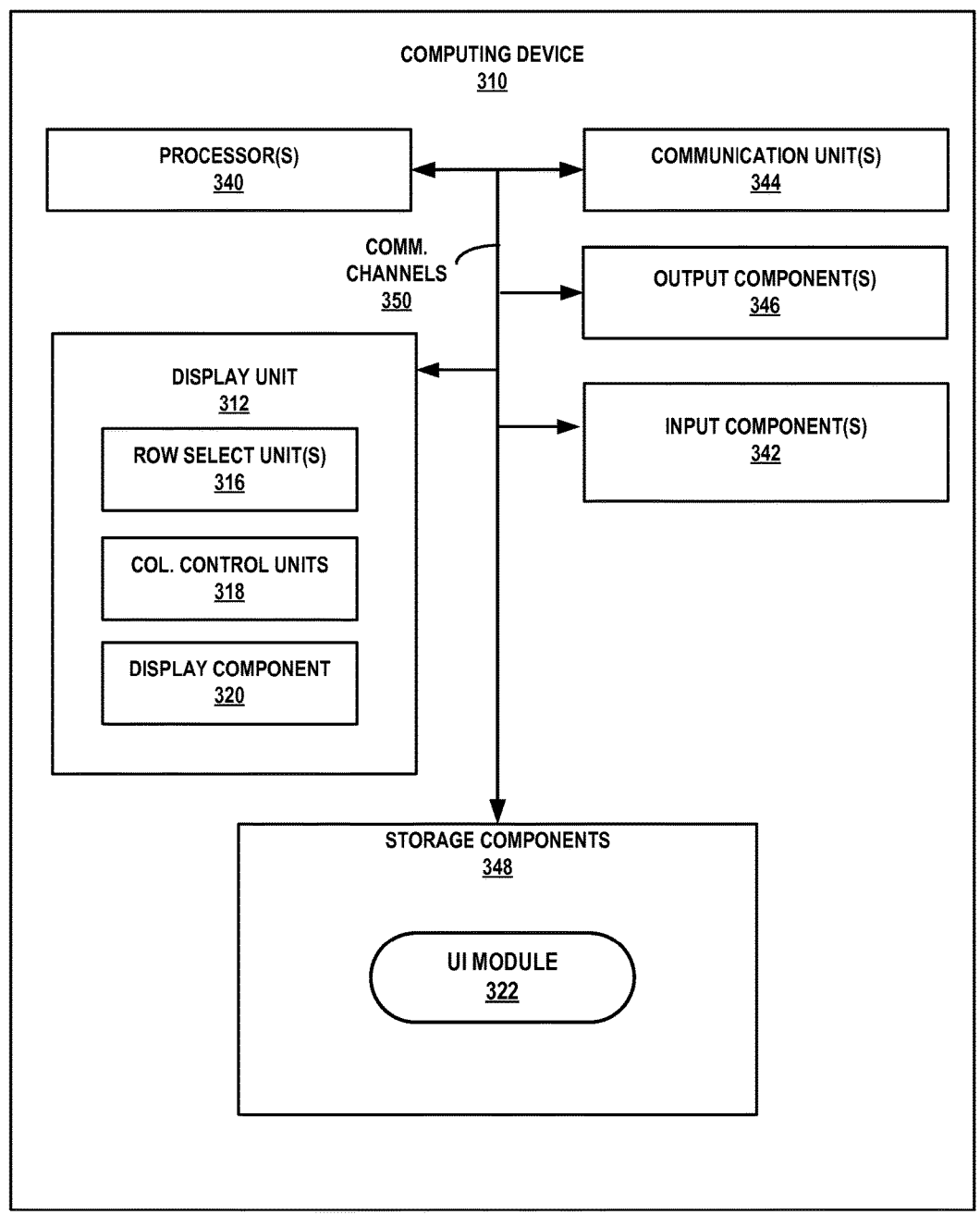
FIG. 3 is a block diagram illustrating an example computing device configured to selectively drive contiguous portions of a pixel-array of an example display unit, in accordance with one or more aspects of the present disclosure.

FIG. 3 is a block diagram illustrating computing device 310 as an example computing device configured to selectively drive contiguous portions of a pixel-array of an example display unit, in accordance with one or more aspects of the present disclosure. Computing device 310 represents a more detailed example of computing device 110 of FIG. 1 and is described below in the context of computing device 110 of FIG. 1 and display unit 212 of FIG. 2. For example, display unit 312 is analogous to display unit 212 of FIG. 2 and display unit 112 of FIG. 1, UI module 322 is analogous to UI module 122 of FIG. 1, etc.

Computing device 310 includes one or more processors 340, one or more communication unit 344, one or more output components 364, one or more input components 342, display unit 312, and one or more storage components 348. Storage components 348 include UI module 322 and display unit 312 includes one or more row select units 316, column control units 318, and display component 320. Each of components 312, 316, 318, 320, 340, 342, 344, 346, and 348 is communicatively coupled via one or more communication channels 350. In other words, communication channels 350 may interconnect each of the components 312, 316, 318, 320, 340, 342, 344, 346, and 348 for inter-component communications (physically, communicatively, and/or operatively). In some examples, communication channels 350 may include a system bus, a network connection, an inter-process communication data structure, or any other method for communicating data.

One or more input components 342 of computing device 310 may receive input. Examples of input are tactile, audio, and video input. Input components 342 of computing device 310, in one example, includes a presence-sensitive display, touch-sensitive screen, mouse, keyboard, voice responsive system, video camera, microphone or any other type of device for detecting input from a human or machine. One or more input components 342 may further include one or more sensor components. Numerous examples of sensor components exist and include any input component configured to obtain environmental information about the circumstances surrounding computing device 310 such as one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 346 of computing device 310 may generate output. Examples of output are tactile, audio, and video output. Output components 346 of computing device 310, in one example, includes a presence-sensitive display, sound card, video graphics adapter card, speaker, cathode ray tube (CRT) monitor, LCD, ILED, OLED, or any other type of device for generating output to a human or machine.

One or more communication units 344 of computing device 310 may communicate with external devices via one or more wired and/or wireless networks by transmitting and/or receiving network signals on the one or more networks. Examples of communication units 344 include a network interface card (e.g. such as an Ethernet card), an optical transceiver, a radio frequency transceiver, a GPS receiver, or any other type of device that can send and/or receive information. Other examples of communication units 344 may include short wave radios, cellular data radios, wireless network radios, NFC, as well as universal serial bus (USB) controllers.

One or more processors 340 may implement functionality and/or execute instructions within computing device 310. For example, processors 340 on computing device 310 may receive and execute instructions stored by storage components 348 that execute the functionality of module 322. The instructions executed by processors 340 may cause computing device 310 to store information within storage components 348 during program execution. Examples of processors 340 include application processors, display controllers, sensor hubs, and any other hardware configure to function as a processing unit. Processors 340 may execute instructions of module 322 to cause display unit 312 to configure individual column control units 318 to output or refrain from outputting graphical information for display. That is, module 322 may be operable by processors 340 to perform various actions or functions of computing device 310 described herein.

One or more storage components 348 within computing device 210 may store information for processing during operation of computing device 310 (e.g., computing device 310 may store data accessed by module 322 during execution at computing device 310). In some examples, storage component 348 is a temporary memory, meaning that a primary purpose of storage component 348 is not long-term storage. Storage components 348 on computing device 310 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 348, in some examples, also include one or more computer-readable storage media. Storage components 348 may be configured to store larger amounts of information than volatile memory. Storage components 348 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 348 may store program instructions and/or information (e.g., data) associated with module 322.

Display unit 312 includes display component 320 which represents an array of pixels defined by N rows and M columns. Display unit 312 also includes at least one row select unit 316 configured to select one or more of the N rows of display component 320, a first column control unit of column control units 318 that is configured to drive a first contiguous group of pixels from the array of pixels of display component 320, and a second column control unit of column control units 318 that is configured to drive a second contiguous group of pixels from the array of pixels of display component 320.

In operation, UI module 322 may be executed by one or more processors 340 to determine whether computing device 310 is operating in a full or "high" power mode or whether computing device 310 is operating in a limited or "low" power mode. For example, after a period of inactivity or lack of movement detected by one or more movement sensors of input components 342, UI module 322 may infer that computing device 310 is not being used by a user and therefore, computing device is operating in a low or limited power mode in which lesser power consumption is an important requirement. Conversely, responsive to receiving sensor information indicative of movement detected by one or more movement sensors of input components 342, UI module 322 may infer that computing device 310 is being used by the user and therefore, computing device is operating in a high or full power mode in which the amount of power being consumed by computing device 310 is of lesser concern.

Responsive to determining that the computing device is operating in a low-power operating state, UI module 322 may output, using the first column control unit of column control units 318, for display at the first contiguous group of pixels, first graphical information. In other words, when operating in the limited or low power mode, UI module 322 may configure one of column control units 318 to refrain from outputting graphical information for display and with the other one of column control units 318 that remains configured to output graphical information for display, drive display data at display component 320 for presenting a clock or other graphical image in a portion of display component 320.

Alternatively, responsive to determining that the computing device is operating in a full-power operating state, UI module 322 may output, using the first column control unit and the second column control unit of column control units 318, for display at the first contiguous group of pixels and the second contiguous group of pixels, second graphical information. In other words, when operating in the full or high power mode, UI module 322 may configure both of column control units 318 to drive display data at display component 320 for presenting a fuller or more complete and vibrant graphical image that utilizes the entire display region or pixel array of display component 320.

Figure 4A:
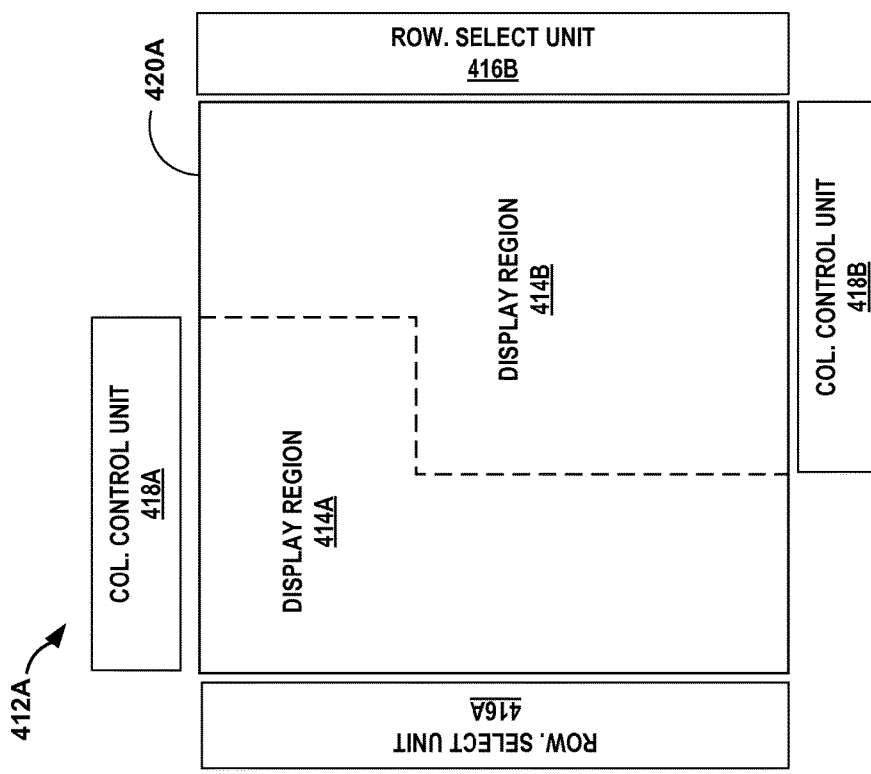
FIGS. 4A and 4B are conceptual diagrams illustrating different example display units each having a plurality of individually selectable, contiguous-display regions of a pixel-array, in accordance with one or more aspects of the present disclosure.
Figure 4B:
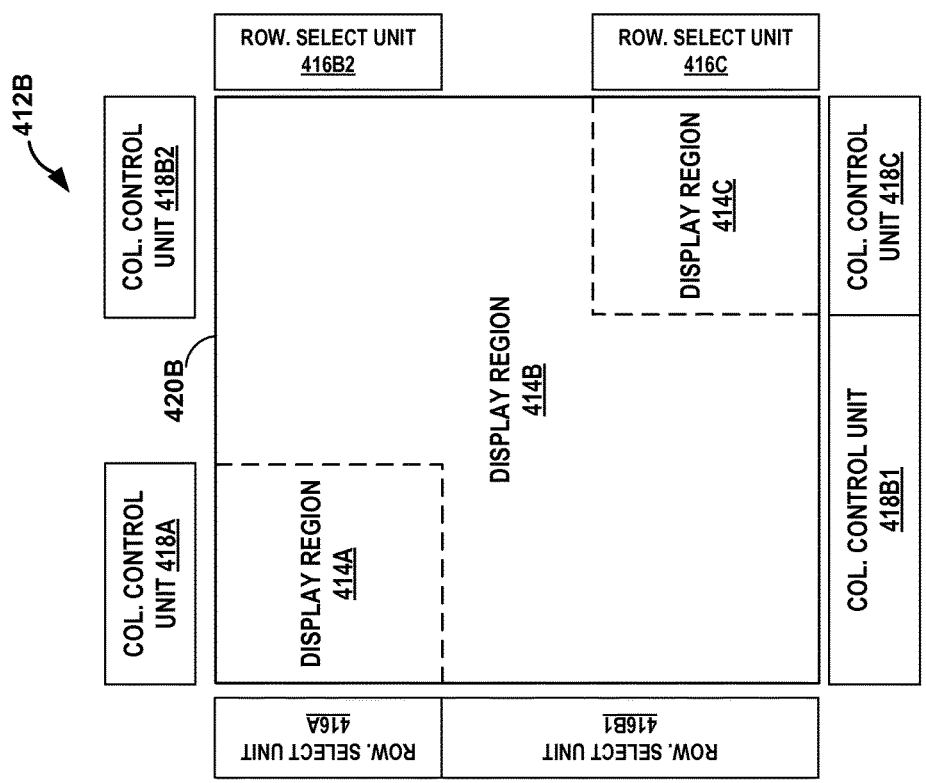

FIGS. 4A and 4B are conceptual diagrams illustrating different example display units 412A and 412B each having a plurality of individually selectable, contiguous-display regions of a pixel-array, in accordance with one or more aspects of the present disclosure. Display unit 412A and display unit 412B represent alternative examples of display unit 212 of FIG. 2 and are described below in the context of FIG. 2.

For example, in FIG. 4A, display unit 412A includes display component or pixel array 420A which represents an alternative example of display component 220 of display unit 212. In FIG. 4B, display unit 412B includes display component or pixel array 420B and represents still another alternative example of display component 220 of display unit 212.

In the example of FIG. 4A, display component 420A is bifurcated into contiguous display regions 414A and 414B. Column control unit 418A is configured to control pixels from display region 414A whereas column control unit 418B is configured to control pixels from display region 414B. Row select unit 416A is configured to select rows of pixels from display region 414A and row select unit 416B is configured to select rows of pixels from display region 414B.

In the example of FIG. 4B, display component 420B is divided into three contiguous display regions 414A, 414B, and 414C. Like display unit 412A, column control unit 418A is configured to control pixels from display region 414A and column control units 418B1 and 418B2 are configured to control pixels from display region 414B. Unlike display unit 412A, display unit 412B includes a third column control unit 418C which is configured to control pixels from display region 414C. Row select unit 416A is configured to select rows of pixels from display region 414A, row select units 416B1 and 416B2 are configured to select rows of pixels from display region 414B, and row select unit 416C is configured to select rows of pixels from display region 414C.

Figure 5:
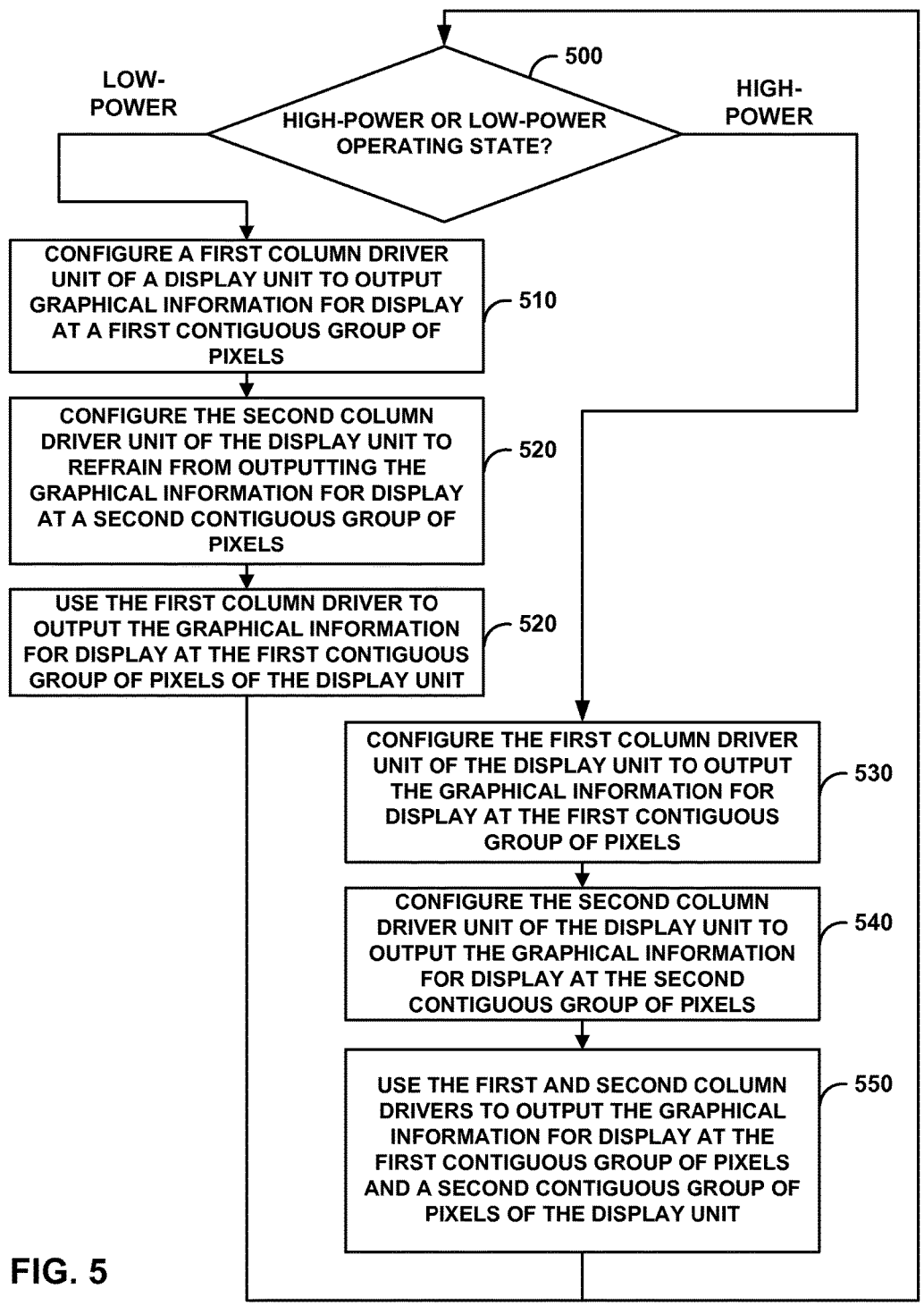
FIG. 5 is a flowchart illustrating example operations of an example computing device configured to selectively drive contiguous portions of a pixel-array of an example display unit, in accordance with one or more aspects of the present disclosure.

FIG. 5 is a flowchart illustrating example operations of an example computing device configured to selectively drive contiguous portions of a pixel-array of an example display unit, in accordance with one or more aspects of the present disclosure. For example, in some instances, at least one processor of computing device 110 of FIG. 1 may configure UI module 120 to perform operations 500-550. In some examples, a computer-readable storage medium of computing device 110 may include instructions that, when executed, configure at least one processor of computing device 110 to perform operations 500-550. The flow chart of FIG. 5 represents one example ordering for operations 500-550. In other examples, an example computing device such as computing device 110 may perform operations 500-550 in a different order. FIG. 5 is described below in the context of computing device 110 of FIG. 1 and display unit 212 of FIG. 2.

In operation, computing device 110 may determine whether computing device 110 is operating in a high-power or a low-power operating state (500). For example, computing device 110 may rely on a timeout timer that tracks durations of time when computing device 110 is not moving, not being worn, or otherwise not being used by a user. In response to not detecting movement or otherwise determining that computing device 110 is not being used for a period of time that exceeds a time threshold, computing device 110 may operate in a low-power operating state to conserve energy stored in a battery. Alternatively, computing device 110 may operate in a high-power operating state where performance and user experience is a priority and conserving electrical energy is of less importance.

Responsive to determining that computing device 110 is operating in the low-power operating state and not the high-power operating state (500), computing device 110 may configure a first column control unit of a display unit to output graphical information for display at a first contiguous group of pixels (510) of the display unit. Specifically, the array of pixels may be defined by N rows and M columns. For example, UI module 122 may send a command to control unit 218A that configures column control unit 218A to drive the pixels of display region 214A with display data.

Further responsive to determining that computing device 110 is operating in the low-power operating state and not the high-power operating state (500), computing device 110 may configure a second column control unit of the display unit to refrain from outputting the graphical information for display at a second contiguous group of pixels (520) of the display unit. For example, UI module 122 may send a command to control unit 218B that configures column control unit 218B to refrain from driving the pixels of display region 214B with display data.

Further responsive to determining that computing device 110 is operating in the low-power operating state and not the high-power operating state (500), computing device 110 may output, using the first column control unit, for display at the first contiguous group of pixels, graphical information (520). For instance, UI module 120 may send command data to column control unit 218A that configures column control unit 218A to drive the pixels of display region 214A and cause the pixels of display region 214A to display a clock or other small graphic or text that computing device presents in an always-on mode.

Alternatively, responsive to determining that computing device 110 is operating in the high-power operating state and not the low-power operating state (500), computing device 110 may configure the first column control unit of the display unit to output the graphical information for display at the first contiguous group of pixels (530) and may configure the second column control unit of the display unit to output the graphical information for display at the second contiguous group of pixels (540). For example, UI module 122 may send a command to both control units 218A and 218B that configures both column control units 218A and 218B to drive the pixels of display regions 214A and 214B with display data.

Further responsive to determining that computing device 110 is operating in the high-power operating state and not the low-power operating state, computing device 110 may use the first column control unit and the second column control unit to output the graphical information for display at the first contiguous group of pixels and at the second contiguous group of pixels (550). For instance, UI module 120 may send command data to column control units 218A and 218B that configures column control units 218A and 218B to drive the pixels of both display regions 214A and 214B with graphical information, thus causing the pixels of display regions 214A and 214B to simultaneously display a larger graphic or more text than what computing device presents in a low power mode.

Clause 1. A computing device comprising: a display unit that includes: an array of pixels defined by N rows and M columns; at least one row select unit configured to select one or more of the N rows; a first column control unit configured to drive a first contiguous group of pixels from the array of pixels; and a second column control unit configured to drive a second contiguous group of pixels from the array of pixels.

Clause 2. The computing device of clause 1, wherein the first contiguous group of pixels and the second contiguous group of pixels are two non-overlapping contiguous groups of pixels.

Clause 3. The computing device of any of clauses 1-2, wherein the at least one row select unit is a first row select unit configured to select each of the N rows of the array of pixels that is associated with the first contiguous group of pixels, and the display unit further includes a second row select unit configured to select each of the N rows of the array of pixels that is associated with the second contiguous group of pixels.

Clause 4. The computing device of any of clauses 1-3, wherein the display unit comprises an emissive pixel display.

Clause 5. The computing device of any of clauses 1-4, wherein each pixel from the array of pixels comprises a light emitting device.

Clause 6. The computing device of any of clauses 1-5, further comprising: at least one processor; and at least one module operable by the at least one processor to: responsive to determining that the computing device is operating in a low-power operating state, output, using the first column control unit, for display at the first contiguous group of pixels, first graphical information; and responsive to determining that the computing device is operating in a full-power operating state, output, using the first column control unit and the second column control unit, for display at the first contiguous group of pixels and the second contiguous group of pixels, second graphical information.

Clause 7. The computing device of any of clauses 1-6, wherein the first contiguous group of pixels have a greater quantity of pixels than the second contiguous group of pixels.

Clause 8. The computing device of any of clauses 1-7, wherein the first and second contiguous groups of pixels have a same quantity of pixels.

Clause 9. The computing device of any of clauses 1-8, wherein the display unit further comprises a third column control unit configured to drive a third contiguous group of pixels from the array of pixels.

Clause 10. A method comprising: responsive to determining that a computing device is operating in a low-power operating state and not a high-power operating state: configuring, by the computing device, a first column control unit of a display unit to drive a first contiguous group of pixels from an array of pixels of the display unit with graphical information, the array of pixels being defined by N rows and M columns; and configuring, by the computing device, a second column control unit of the display unit to drive a second contiguous group of pixels from the array of pixels with the graphical information.

Clause 11. The method of clause 10, further comprising: further responsive to determining that the computing device is operating in the low-power operating state and not the high-power operating state, outputting, by the computing device, using the first column control unit, for display at the first contiguous group of pixels, graphical information.

Clause 12. The method of any of clauses 10-11, further comprising: responsive to determining that the computing device is operating in the high-power operating state and not the low-power operating state: configuring, by the computing device, the first column control unit to drive the first contiguous group of pixels with the graphical information; and configuring, by the computing device, the second column control unit to drive the second contiguous group of pixels with the graphical information.

Clause 13. The method of clause 12, further comprising: further responsive to determining that the computing device is operating in the high-power operating state and not the low-power operating state, outputting, by the computing device, using the first column control unit and the second column control unit, for display at the first contiguous group of pixels and at the second contiguous group of pixels, graphical information.

Clause 14. The method of any of clauses 10-13, wherein the first contiguous group of pixels and the second contiguous group of pixels are two non-overlapping contiguous group of pixels.

Clause 15. The method of any of clauses 10-14, wherein the first contiguous group of pixels have a greater quantity of pixels than the second contiguous group of pixels or the first and second contiguous groups of pixels have a same quantity of pixels.

Clause 16. The method of any of clauses 10-15, wherein configuring the second column control unit of the display unit to refrain from driving the second contiguous group of pixels from the array of pixels with the graphical information comprises at least one of: configuring, by the computing device, the second column control unit to hold column drivers associated with the second contiguous group of pixels in a steady-state; or configuring, by the computing device, the second column control unit to remove VPIX power from the second contiguous group of pixels.

Clause 17. A computer-readable storage medium comprising instructions that, when executed, cause at least one processor of a computing device to: responsive to determining that a computing device is operating in a low-power operating state and not a high-power operating state: configure a first column control unit of a display unit to drive a first contiguous group of pixels from an array of pixels of the display unit with graphical information, the array of pixels being defined by N rows and M columns; and configure a second column control unit of the display unit to drive a second contiguous group of pixels from the array of pixels with the graphical information.

Clause 18. The computer-readable storage medium of clause 17, wherein the instructions, when executed, further cause the at least one processor of the computing device to: further responsive to determining that the computing device is operating in the low-power operating state and not the high-power operating state, output, using the first column control unit, for display at the first contiguous group of pixels, the graphical information.

Clause 19. The computer-readable storage medium of any of clauses 17-18, wherein the instructions, when executed, further cause the at least one processor of the computing device to: responsive to determining that the computing device is operating in the high-power operating state and not the low-power operating state: configure the first column control unit to drive the first contiguous group of pixels with the graphical information; and configure the second column control unit to drive the second contiguous group of pixels with the graphical information.

Clause 20. The computer-readable storage medium of clause 19, wherein the instructions, when executed, further cause the at least one processor of the computing device to: further responsive to determining that the computing device is operating in the high-power operating state and not the low-power operating state, output, using the first column control unit and the second column control unit, for display at the first contiguous group of pixels and at the second contiguous group of pixels, the graphical information.

Clause 21. A system comprising means for performing any of the methods of clauses 10-16.

Clause 21. The computing device of clause 1, comprising at least one processor configured to perform any of the methods of clauses 10-16.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperable hardware units, including one or more processors as described above, in conjunction with suitable software and/or firmware.

Various examples have been described. These and other examples are within the scope of the following claims.

What is claimed is:

1. A computing device comprising:
    a display unit that includes:
        an array of pixels defined by N rows and M columns;
        at least one row select unit configured to select one or more of the N rows;
        a first column control unit coupled to a first contiguous group of pixels from the array of pixels by a first group of column control wires; and
        a second column control unit coupled to a second contiguous group of pixels from the array of pixels by a second group of column control wires;
    at least one processor; and
    at least one module operable by the at least one processor to:
        determine whether the computing device is operating in a low-power operating state or in a high-power operating state; and
        responsive to determining that the computing device is operating in the low-power operating state and not the high-power operating state:
            configure the first column control unit to drive the first contiguous group of pixels with graphical information; and
            configure the second column control unit to refrain from driving the second group of contiguous pixels with graphical information by connecting each column control wire of the second group of column control wires to a constant low voltage power supply and disconnecting each column control wire of the second group of column control wires from one or more linear driver circuits.

2. The computing device of claim 1, wherein the first contiguous group of pixels and the second contiguous group of pixels are two non-overlapping contiguous groups of pixels.

3. The computing device of claim 1, wherein the at least one row select unit is a first row select unit configured to select each of the N rows of the array of pixels that is associated with the first contiguous group of pixels, and the display unit further includes a second row select unit configured to select each of the N rows of the array of pixels that is associated with the second contiguous group of pixels.

4. The computing device of claim 1, wherein the display unit comprises an emissive pixel display.

5. The computing device of claim 1, wherein each pixel from the array of pixels comprises a light emitting device.

6. The computing device of claim 1,
    wherein the at least one module is further operable by the at least one processor to:
        responsive to determining that the computing device is operating in the low-power operating state, output, using the first column control unit, for display at the first contiguous group of pixels, the graphical information; and
        responsive to determining that the computing device is operating in the high-power operating state, output, using the first column control unit and the second column control unit, for display at the first contiguous group of pixels and the second contiguous group of pixels, the graphical information.

7. The computing device of claim 1, wherein the first contiguous group of pixels have a greater quantity of pixels than the second contiguous group of pixels.

8. The computing device of claim 1, wherein the first and second contiguous groups of pixels have a same quantity of pixels.

9. The computing device of claim 1, wherein the display unit further comprises a third column control unit configured to drive a third contiguous group of pixels from the array of pixels.

10. The computing device of claim 1,
    wherein the second column control unit includes a multiplexer, and
    wherein configuring the second column control unit to refrain from driving the second group of contiguous pixels with graphical information includes using the multiplexer to connect each column control wire of the second group of column control wires to the constant low voltage power supply and disconnect each column control wire of the second group of column control wires from the one or more linear circuit drivers.

11. A method comprising:
- determining, by a computing device, whether the computing device is operating in a low-power operating state or in a high-power operating state;
- responsive to determining that the computing device is operating in the low-power operating state and not the high-power operating state:
  - configuring, by the computing device, a first column control unit of a display unit to drive a first contiguous group of pixels from an array of pixels of the display unit with graphical information, the array of pixels being defined by N rows and M columns; and
  - configuring, by the computing device, a second column control unit of the display unit to refrain from driving a second contiguous group of pixels from the array of pixels with the graphical information by connecting each column control wire of a group of column control wires to a constant low voltage power supply and disconnecting each column control wire of the group of column control wires from one or more linear driver circuits.

12. The method of claim 10, further comprising:
- further responsive to determining that the computing device is operating in the low-power operating state and not the high-power operating state, outputting, by the computing device, using the first column control unit, for display at the first contiguous group of pixels, the graphical information.

13. The method of claim 11, further comprising:
- responsive to determining that the computing device is operating in the high-power operating state and not the low-power operating state:
  - configuring, by the computing device, the first column control unit to drive the first contiguous group of pixels with the graphical information; and
  - configuring, by the computing device, the second column control unit to drive the second contiguous group of pixels with the graphical information.

14. The method of claim 13, further comprising:
- further responsive to determining that the computing device is operating in the high-power operating state and not the low-power operating state, outputting, by the computing device, using the first column control unit and the second column control unit, for display at the first contiguous group of pixels and at the second contiguous group of pixels, graphical information.

15. The method of claim 11, wherein the first contiguous group of pixels and the second contiguous group of pixels are two non-overlapping contiguous group of pixels.

16. The method of claim 11, wherein the first contiguous group of pixels have a greater quantity of pixels than the second contiguous group of pixels or the first and second contiguous groups of pixels have a same quantity of pixels.

17. A computer-readable storage medium comprising instructions that, when executed, cause at least one processor of a computing device to:
- determine whether the computing device is operating in a low-power operating state or in a high-power operating state;
- responsive to determining that the computing device is operating in the low-power operating state and not the high-power operating state:
  - configure a first column control unit of a display unit to drive a first contiguous group of pixels from an array of pixels of the display unit with graphical information, the array of pixels being defined by N rows and M columns; and
  - configure a second column control unit of the display unit to drive a second contiguous group of pixels from the array of pixels with the graphical information by connecting each column control wire of a group of column control wires to a constant low voltage power supply and disconnecting each column control wire of the group of column control wires from one or more linear driver circuits.

18. The computer-readable storage medium of claim 17, wherein the instructions, when executed, further cause the at least one processor of the computing device to:
- further responsive to determining that the computing device is operating in the low-power operating state and not the high-power operating state, output, using the first column control unit, for display at the first contiguous group of pixels, the graphical information.

19. The computer-readable storage medium of claim 17, wherein the instructions, when executed, further cause the at least one processor of the computing device to:
- responsive to determining that the computing device is operating in the high-power operating state and not the low-power operating state:
  - configure the first column control unit to drive the first contiguous group of pixels with the graphical information; and
  - configure the second column control unit to drive the second contiguous group of pixels with the graphical information.

20. The computer-readable storage medium of claim 19, wherein the instructions, when executed, further cause the at least one processor of the computing device to:
- further responsive to determining that the computing device is operating in the high-power operating state and not the low-power operating state, output, using the first column control unit and the second column control unit, for display at the first contiguous group of pixels and at the second contiguous group of pixels, the graphical information.

* * * * *

UNITED STATES PATENT AND TRADEMARK OFFICE
CERTIFICATE OF CORRECTION

PATENT NO. : 9,746,896 B1
APPLICATION NO. : 14/851344
DATED : August 29, 2017
INVENTOR(S) : Roman Lewkow and Philipp Schmaelzle Page 1 of 1

It is certified that error appears in the above-identified patent and that said Letters Patent is hereby corrected as shown below:

In the Claims

Column 19, Line 22 (Claim 12): Replace "The method of claim 10, further comprising:" with --The method of claim 11, further comprising:--

Signed and Sealed this
Ninth Day of October, 2018

Andrei Iancu
*Director of the United States Patent and Trademark Office*